(12) United States Patent
Fujita et al.

(10) Patent No.: US 11,245,548 B2
(45) Date of Patent: Feb. 8, 2022

(54) SLAVE DEVICE AND COMMUNICATION SYSTEM

(71) Applicant: KABUSHIKI KAISHA YASKAWA DENKI, Kitakyushu (JP)

(72) Inventors: Manabu Fujita, Kitakyushu (JP); Wataru Nozaki, Kitakyushu (JP); Isamu Matsumura, Kitakyushu (JP); Junya Hisamatsu, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 9 days.

(21) Appl. No.: 16/794,232

(22) Filed: Feb. 19, 2020

(65) Prior Publication Data
US 2020/0280460 A1 Sep. 3, 2020

(30) Foreign Application Priority Data
Feb. 28, 2019 (JP) .............................. JP2019-035977

(51) Int. Cl.
*H04L 12/40* (2006.01)
*H04L 12/403* (2006.01)
*H04L 29/08* (2006.01)

(52) U.S. Cl.
CPC ...... *H04L 12/40045* (2013.01); *H04L 12/403* (2013.01); *H04L 67/12* (2013.01); *H04L 2012/40228* (2013.01)

(58) Field of Classification Search
CPC ......... H04L 12/40045; H04L 12/40228; H04L 67/12; H04L 67/40169; H04L 67/403; G06F 13/4247; G06F 13/4282
See application file for complete search history.

(56) References Cited

U.S. PATENT DOCUMENTS

| 6,230,190 B1 * | 5/2001 | Edmonds ................ H04L 67/00 709/213 |
| 2003/0140251 A1 * | 7/2003 | Marin ..................... G06F 21/50 726/3 |
| 2004/0210322 A1 * | 10/2004 | Takeuchi ................ G05B 9/02 700/21 |

(Continued)

FOREIGN PATENT DOCUMENTS

| EP | 1315355 | 5/2003 |
| JP | 63-50138 | 3/1988 |

(Continued)

OTHER PUBLICATIONS

Extended European Search Report for corresponding EP Application No. 20160057.4-1216, dated Jun. 23, 2020.

*Primary Examiner* — Stephen J Clawson
(74) *Attorney, Agent, or Firm* — Mori & Ward, LLP

(57) ABSTRACT

A slave device includes a first connector, a second connector, a switch, and a communication circuit. The switch is alternatively connectable to the first connector or the second connector according to a connection way via which the slave device is connected to a master device and another slave device. The communication circuit is connected to the first connector and the switch. The communication circuit is configured to transmit and receive a first communication signal to and from the first connector, and is configured to transmit and receive a second communication signal to and from the switch.

13 Claims, 5 Drawing Sheets

(56) References Cited

U.S. PATENT DOCUMENTS

| | | | |
|---|---|---|---|
| 2006/0267993 A1* | 11/2006 | Hunkins | G06F 15/16 |
| | | | 345/502 |
| 2007/0143510 A1 | 6/2007 | Schultze | |
| 2008/0266455 A1* | 10/2008 | Kim | H04N 21/436 |
| | | | 348/552 |
| 2009/0128061 A1* | 5/2009 | Dilley | H05B 47/155 |
| | | | 315/317 |
| 2011/0208362 A1* | 8/2011 | Alstrin | G05D 7/0635 |
| | | | 700/282 |
| 2014/0162680 A1* | 6/2014 | Kotecha | H04W 28/08 |
| | | | 455/453 |
| 2015/0042788 A1* | 2/2015 | Fujiwara | H04N 5/2256 |
| | | | 348/131 |
| 2016/0266568 A1 | 9/2016 | Kiribuchi | |
| 2017/0307102 A1* | 10/2017 | Schmidt | F16K 37/0025 |
| 2021/0165443 A1* | 6/2021 | Arakawa | H04J 3/0658 |

FOREIGN PATENT DOCUMENTS

| | | |
|---|---|---|
| JP | 4935336 B2 | 7/2008 |
| JP | 2010-238000 | 10/2010 |
| JP | 6349687 B2 | 5/2015 |
| WO | WO 2011/021650 | 2/2011 |
| WO | WO 2012/091998 | 7/2012 |

\* cited by examiner

SLAVE DEVICE AND COMMUNICATION SYSTEM

CROSS-REFERENCE TO RELATED APPLICATIONS

The present application claims priority under 35 U.S.C. § 119 to Japanese Patent Application No. 2019-035977, filed Feb. 28, 2019. The contents of this application are incorporated herein by reference in their entirety.

BACKGROUND

Field of the Invention

The embodiments disclosed herein relate to a slave device and a communication system.

Discussion of the Background

JP63-050138A, JP2010-238000A, JP4935336B, and JP6349687B disclose a communication system that includes a master device and a plurality of slave devices.

In communication systems, there are two typical types of connection (physical topology) between a master device and a plurality of slave devices, namely, cascade connection (or daisy-chain connection, line connection, or linear connection) and T-branch connection.

SUMMARY

According to one aspect of the present disclosure, a slave device includes a first connector, a second connector, a switch, and a communication circuit. The switch is alternatively connectable to the first connector or the second connector according to a connection way via which the slave device is connected to a master device and another slave device. The communication circuit is connected to the first connector and the switch. The communication circuit is configured to transmit and receive a first communication signal to and from the first connector, and is configured to transmit and receive a second communication signal to and from the switch.

According to another aspect of the present disclosure, a communication system includes a slave device, a master device connected to the slave device, and another slave device connected to the slave device. The slave device includes a first connector, a second connector, a switch, and a communication circuit. The switch is alternatively connectable to the first connector or the second connector according to a connection way via which the slave device is connected to the master device and the another slave device. The communication circuit is connected to the first connector and the switch. The communication circuit is configured to transmit and receive a first communication signal to and from the first connector, and is configured to transmit and receive a second communication signal to and from the switch.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Embodiments will be described by referring to FIGS. 1 to 6.

First Embodiment

By referring to FIGS. 1 to 3, an example configuration of a communication system 1 according to this embodiment will be described.

It is to be noted that the communication system 1 according to this embodiment may be used in a sensor communication network or in a modbus communication network.

Figure 1:
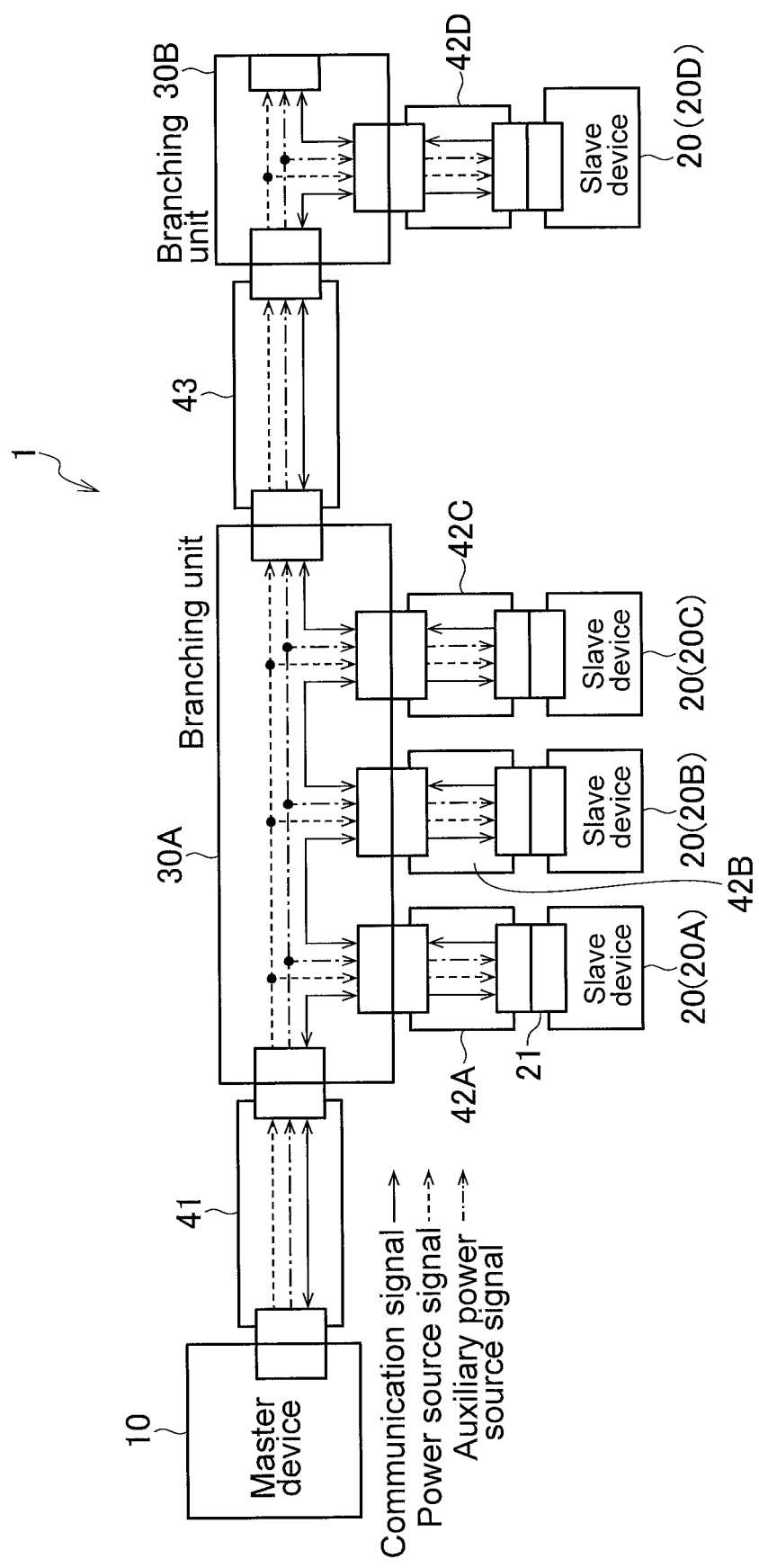
FIG. 1 is a schematic illustrating an example overall configuration of a communication system according to a first embodiment.
Figure 2:
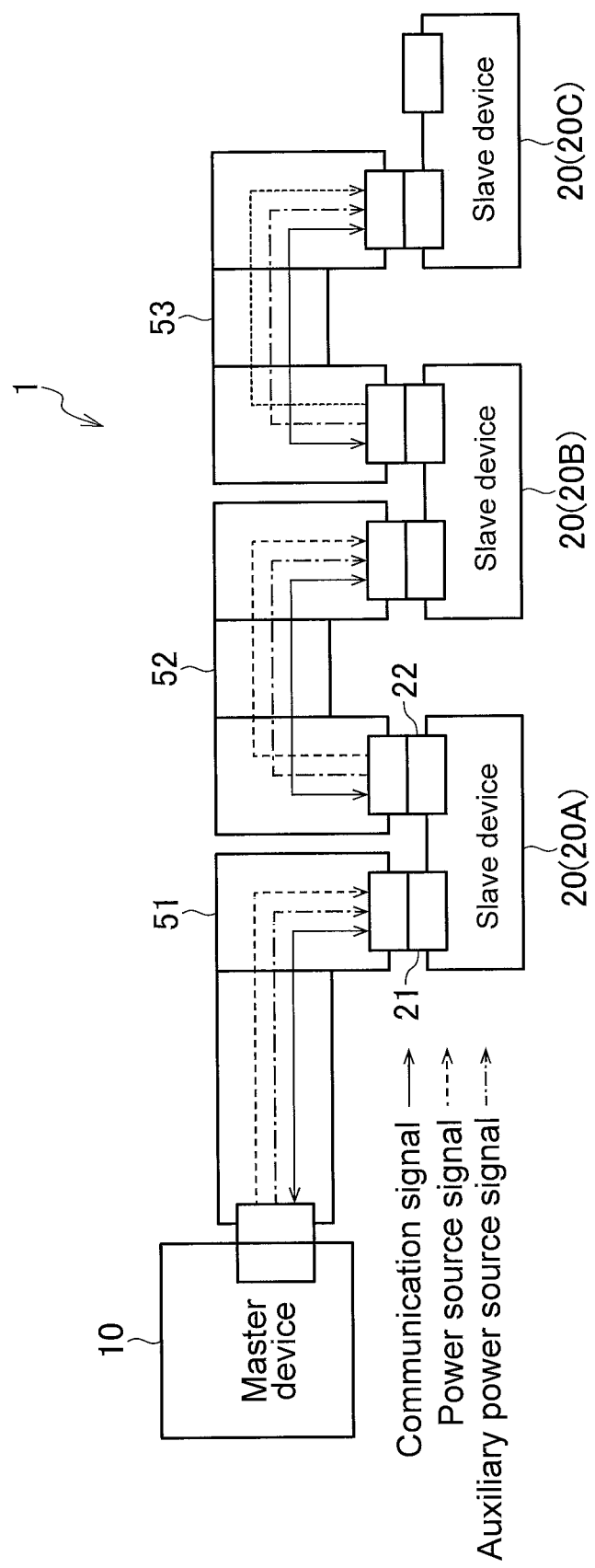
FIG. 2 is a schematic illustrating another example overall configuration of the communication system according to the first embodiment.

As illustrated in FIGS. 1 and 2, the communication system 1 according to this embodiment includes a master device 10 and a plurality of slave devices 20 (20A, 20B, 20C, and 20D). In the communication system 1 according to this embodiment, the type of connection (physical topology) between the master device 10 and the plurality of slave devices 20 may be T-branch connection as illustrated in FIG. 1 or may be cascade connection as illustrated in FIG. 2.

In T-branch connection, which is illustrated in FIG. 1, the master device 10 is connected to a branching unit 30A via a transmission path (cable) 41; the slave devices 20A, 20B, and 20C are connected to the branching unit 30A via transmission paths 42A, 42B, and 42C, respectively; the slave device 20D is connected to a branching unit 30B via a transmission path 42D; and the branching unit 30A and the branching unit 30B are connected to each other via a transmission path 43.

In this T-branch connection, communication signals are transmitted and received by bidirectional communication between the master device 10 and the slave device 20A, between the slave device 20A and the slave device 20B, between the slave device 20B and the slave device 20C, and between the slave device 20C and the slave device 20D.

Also in this T-branch connection, power source signals and auxiliary power source signals from the master device 10 are supplied to: the slave devices 20A, 20B, and 20C via the transmission path 41, the branching unit 30A, and the transmission paths 42A, 42B, and 42C; and the slave device 20D via the transmission path 41, the branching unit 30A, the transmission path 43, the branching unit 30B, and the transmission path 42D.

While the type of connection illustrated in FIG. 1 is termed herein as "T-branch connection", it is also possible to use some other term for the type of connection illustrated in FIG. 1.

In cascade connection, which is illustrated in FIG. 2, the master device 10 is connected to the slave device 20A via a transmission path 51; the slave device 20A is connected to the slave device 20B via a transmission path 52; and the slave device 20B is connected to the slave device 20C via a transmission path 53.

Also in this cascade connection, communication signals are transmitted and received by bidirectional communication between the master device 10 and the slave device 20A, between the slave device 20A and the slave device 20B, and between the slave device 20B and the slave device 20C.

Also in this cascade connection, power source signals and auxiliary power source signals from the master device 10 are transmitted to the slave device 20A via the transmission path 51; then to the slave device 20B via the transmission path 52; and then to the slave device 20C via the transmission path 53.

While the type of connection illustrated in FIG. 2 is termed herein as "cascade connection", it is also possible to use some other term for the type of connection illustrated in FIG. 2.

In the communication system 1 according to this embodiment, examples of the master device 10 include, but are not limited to, a motor controller for a servo amplifier, a multi-axis controller, a programmable logic controller, and a motion controller. Also in the communication system 1 according to this embodiment, examples of the slave devices 20A, 20B, 20C, and 20D include, but are not limited to: various sensors (such as a distance sensor, a vibration sensor, a temperature sensor, a pressure sensor, a contact sensor, a illuminance sensor, a color temperature sensor, and a photoelectronic sensor); encoders; and linear scales.

Figure 3:
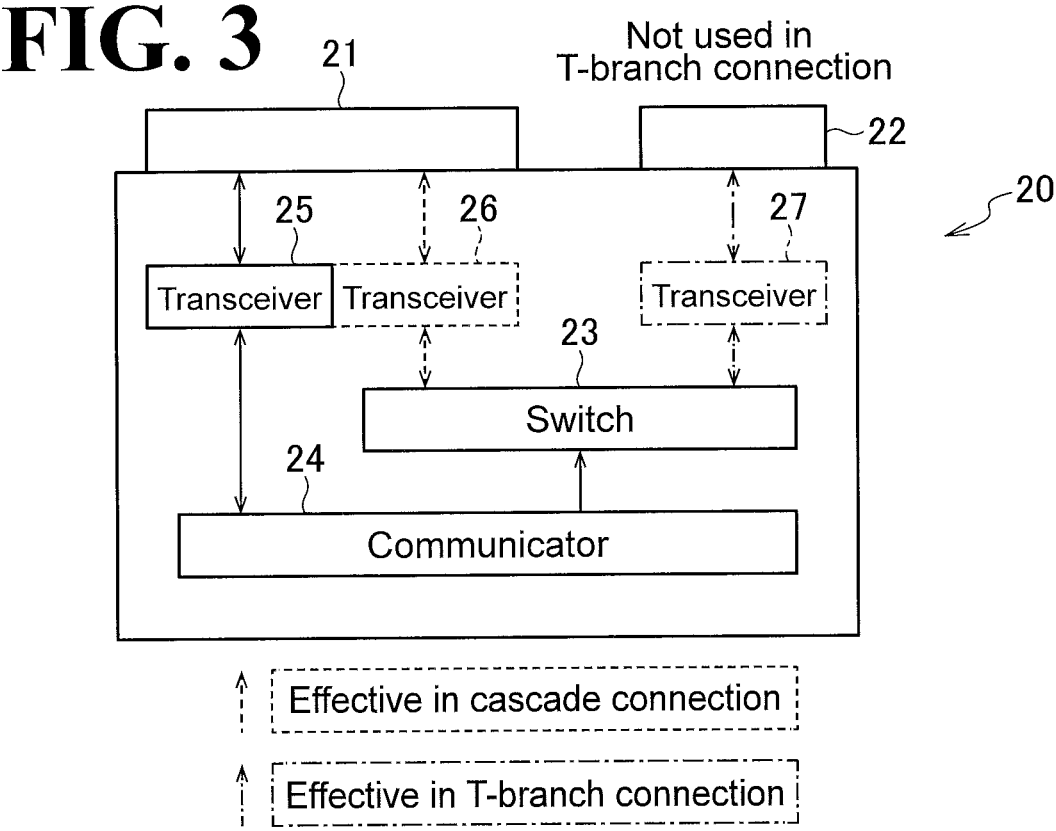
FIG. 3 illustrates an example functional block of a slave device constituting a part of the communication system according to the first embodiment.

As illustrated in FIG. 3, the slave device 20A according to this embodiment includes a connector 21 (first connector), a connector 22 (second connector), a switch 23, a communicator 24, a transceiver 25 (first transceiver), a transceiver 26 (second transceiver), and a transceiver 27 (third transceiver).

When the T-branch connection illustrated in FIG. 1 is employed, the connector 21 is connected to a transmission path 42A. When the cascade connection illustrated in FIG. 2 is employed, the connector 21 is connected to the transmission path 51. When the T-branch connection illustrated in FIG. 1 is employed, the connector 22 is not used. When the cascade connection illustrated in FIG. 2 is employed, the connector 22 is connected to the transmission path 52.

The communicator 24 (which is a non-limiting example of the communication circuit recited in the appended claims) is connected to the connector 21 and the switch 23. The communicator 24 transmits and receives a first communication signal to and from the connector 21, and transmits and receives a second communication signal to and from the switch 23.

Specifically, the communicator 24 may be connected to the connector 21 via the transceiver 25. In this case, the communicator 24 may transmit and receive a first communication signal to and from the connector 21 via the transceiver 25.

Examples of the communicator 24 include, but are not limited to, a central processing unit (CPU), an application specific integrated circuit (ASIC), and a field-programmable gate array (FPGA).

The transceiver 25 is located between and connected to the connector 21 and the communicator 24, and converts the protocol of the first communication signal. The transceiver 26 is located between and connected to the connector 21 and the switch 23, and converts the protocol of the second communication signal. The transceiver 27 is located between and connected to the connector 22 and the switch 23, and converts the protocol of the second communication signal.

The transceivers 25, 26, and 27 are high-speed transmission interfaces IC for communication signals transmitted from the communicator 24 and/or communication signals received from the connector 21/22 (for example, RS422 signals and RS485 signals).

A non-limiting example of the switch 23 is a switching circuit such as an analogue switch, and the switch 23 is connectable to at least one connector among the connector 21 and the connector 22.

Specifically, based on the type of connection between the slave device 20A and the master device 10 and the type of connection between the slave device 20A and the slave devices 20B, 20C, and 20D (lower-level slave devices), the switch 23 switches the connection end (to which the switch 23 is connected) between the connector 21 and the connector 22.

For example, when the type of connection is T-branch connection, the switch 23 switches the connection end to the connector 21 (the transceiver 26). When the type of connection is cascade connection, the switch 23 switches the connection end to the connector 22.

The switch 23 may, upon turning-on of the slave device 20A, check a connection state indicating whether the connection end is the first connector 21 or the second connector 22.

Also, the communicator 24 may manage the connection state and notify the switch 23 of the connection state upon receipt of a connection request signal from the master device 10 via the connector 21. The switch 23 may switch the connection end between the connector 21 and the connector 22 based on the connection state that has been notified.

It is to be noted that the switch 23 may be, in its initial state, connected at least one connector among the connector 21 and the connector 22.

Upon receipt of a connection request signal from the master device 10 via the connector 21, the communicator 24 may forward the connection request signal to the slave device 20B via the switch 23.

In this case, when the communicator 24 has received from the slave device 20B a response signal responsive to the connection request signal within a predetermined period of time, the communicator 24 transmits to the master device 10 a comiection completion signal responsive to the connection request signal.

When the communicator 24 has not received from the slave device 20B the response signal within the predetermined period of time, the communicator 24 instructs the switch 23 to switch the connection end.

Alternatively, the switch 23 may transmit a check signal to the slave device 20B via the connector 21 or the connector 22 to which the switch 23 is connected.

In this case, when the switch 23 has not received from the slave device 20B a response signal responsive to the check signal within a predetermined period of time, the switch 23 switches the connection end.

When the switch 23 has received from the slave device 20B the response signal within the predetermined period of time, the switch 23 does not switch the connection end.

Second Embodiment

By referring to FIG. 4, a communication system 1 according to the second embodiment will be described, with a primary focus on differences from the communication system 1 according to the first embodiment.

Figure 4:
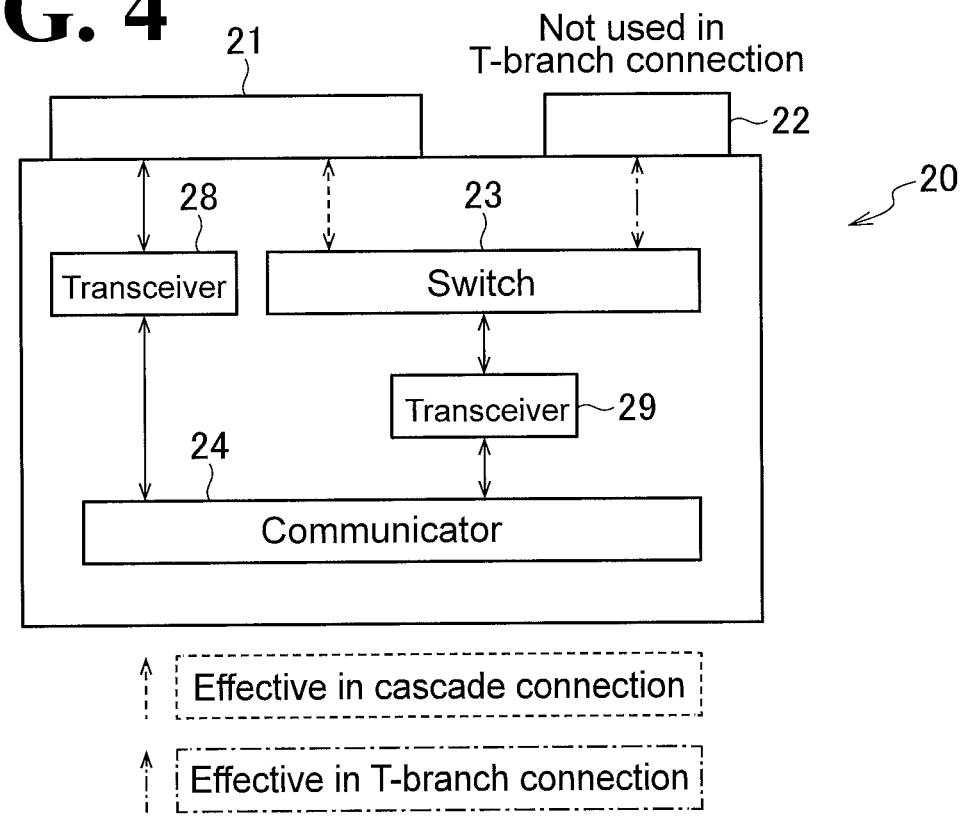
FIG. 4 illustrates an example functional block of a slave device constituting a part of a communication system according to a second embodiment.

As illustrated in FIG. 4, in the slave device 20A according to this embodiment, a transceiver 28 (first transceiver) is located between and connected to the connector 21 and the communicator 24, and a transceiver 29 is located between and connected to the switch 23 and the communicator 24.

Modifications

Figure 5:
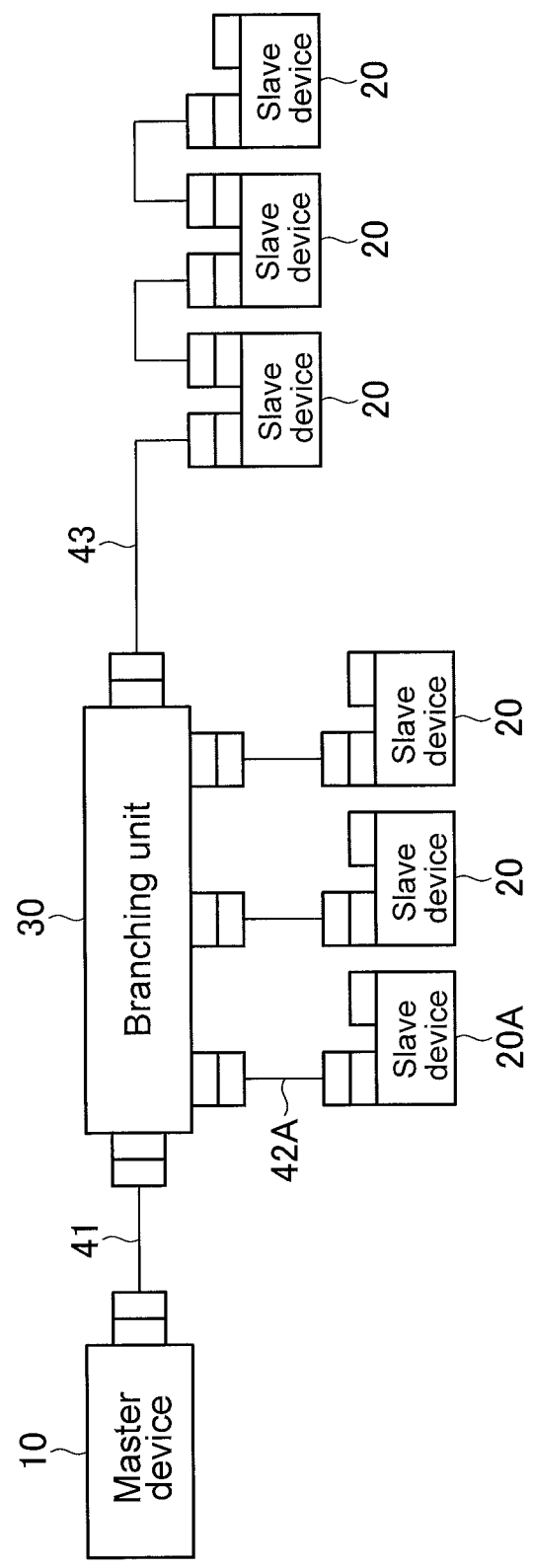
FIG. 5 is a schematic illustrating an example overall configuration of a communication system according to a modification of the first and second embodiments.
Figure 6:
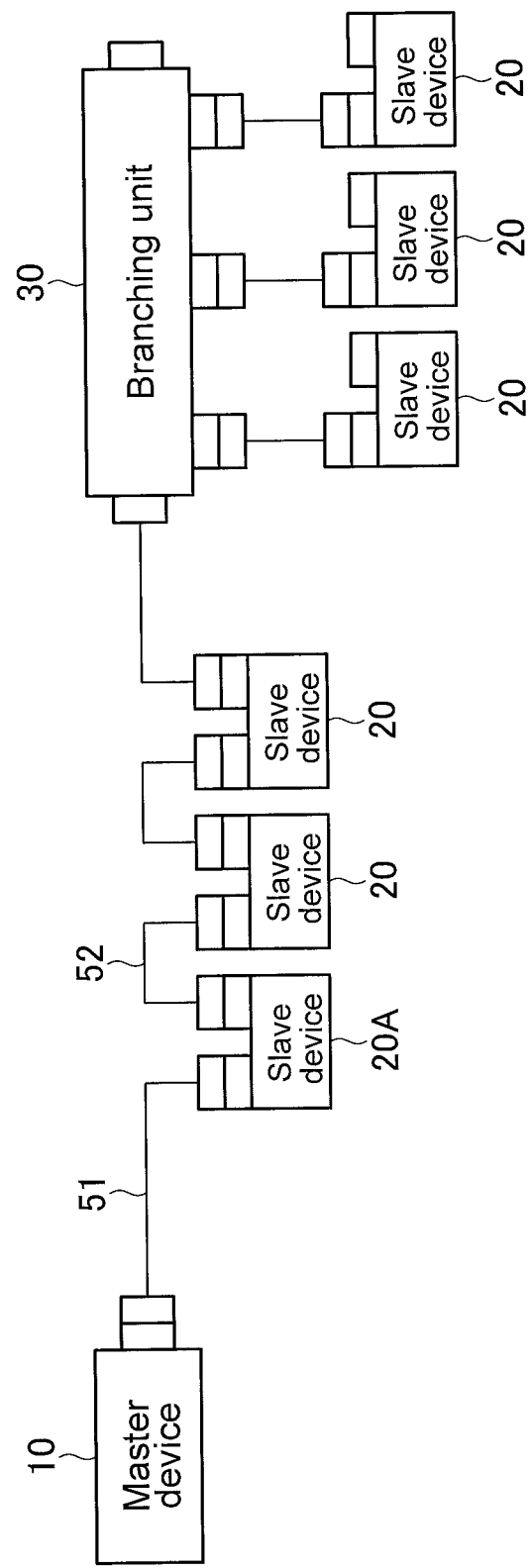
FIG. 6 is a schematic illustrating an example overall configuration of a communication system according to another modification of the first and second embodiments.

The slave device 20A according to the first or second embodiment may have the type of connection illustrated in FIG. 5. Specifically, a plurality of slave devices 20 are connected by T-branch connection on the upstream side, and a plurality of other slave devices 20 are connected by cascade connection on the downstream side. The slave device 20A according to the first or second embodiment may also have the type of connection illustrated in FIG. 6. Specifically, a plurality of slave devices 20 are connected by cascade connection on the upstream side, and a plurality of slave devices 20 are connected by T-branch connection on the downstream side.

Advantageous Effects of the First and Second Embodiments

As has been described hereinbefore, the slave device 20A used in the communication system 1 is connected to the master device 10 via the transmission path 42A and the transmission path 41, and is connected to the slave device 20B via the transmission path 42A and the transmission path 42B. The slave device 20A includes the connector 21, the connector 22, the switch 23, and the communicator 24. The switch 23 is connectable to a connection end switchable between the connector 21 and the connector 22. The communicator 24 is connected to the connector 21 and the switch 23. The communicator 24 transmits and receives a first communication signal to and from the connector 21, and transmits and receives a second communication signal to and from the switch 23. The switch 23 switches the connection end between the connector 21 and the connector 22 based on the type of connection of the slave device 20A with the master device 10 and the slave devices 20B, 20C, and 20D.

With this configuration, the switch 23 switches the transmission or receiving end of the second communication signal (which is transmitted and received to and from the slave device 23B) between the connector 21 and the connector 22. This makes the single slave device 20A usable in both types of connection, cascade connection and T-branch connection.

The slave device 20A may further include the transceiver 25, the transceiver 26, and the transceiver 27. The transceiver 25 is located between and connected to the connector 21 and the communicator 24. The transceiver 26 is located between and connected to the connector 21 and the switch 23. The transceiver 27 is located between and connected to the connector 22 and the switch 23.

This ensures that the second communication signal transmitted from the communicator 24 can be switched quickly.

The slave device 20A may further include the transceiver 28 and the transceiver 29. The transceiver 28 is located between and connected to the connector 21 and the communicator 24. The transceiver 29 is located between and connected to the switch 23 and the communicator 24.

This ensures that the first communication signal and the second communication signal transmitted from the communicator 24 can be switched using a small number of transceivers (for example, two transceiver 28 and 29).

Also in the slave device 20A, when the type of connection is T-branch connection, the switch 23 may switch the connection end to the connector 21. When the type of connection is cascade connection, the switch 23 may switch the connection end to the connector 22.

This ensures that the transmission or receiving end of the second communication signal is switched appropriately using the single slave device 20A in both types of connection, cascade connection and T-branch connection.

Also in the slave device 20A, the switch 23 may check the connection state upon turning-on of the slave device 20A. This enables a communication to start quickly after power of the slave device 20A is on.

Also in the slave device 20A, the communicator 24 may manage the connection state and notify the switch 23 of the connection state upon receipt of a connection request signal from the master device 10 via the connector 21. The switch 23 may switch the connection end based on the connection state that has been notified.

Also in the slave device 20A, the switch 23 may, in its initial state, be connected to at least one connector among the connector 21 and the connector 22. The communicator 24 may, upon receipt of a connection request signal from the master device 10 via the connector 21, forward the connection request signal to the slave device 20B via the switch 23. When the communicator 24 has received, from the slave device 20B, a response signal responsive to the connection request signal within a predetermined period of time, the communicator 24 may transmit to the master device 10 a connection completion signal responsive to the connection request signal. When the communicator 24 has not received the response signal from the slave device 20B within the predetermined period of time, the communicator 24 may instruct the switch 23 to switch the connection end.

This ensures that the type of connection is checked quickly in response to a connection request signal received from the existing master device 10 serving as a trigger.

Also in the slave device 20A, the switch 23 may, in its initial state, be connected to at least one connector among the connector 21 and the connector 22. The switch 23 may transmit a check signal to the slave device 20B via the connector 21 or the connector 22 to which the switch 23 is connected. When the switch 23 has not received from the slave device 20B a response signal responsive to the check signal within a predetermined period of time, the switch 23 may switch the connection end. This ensures that the switch 23 is capable of autonomously checking the type of connection without waiting for a connection request signal from the master device 10.

In the slave device 20A and the communication system 1 according to the first and second embodiments, a single slave device 20A is usable in both types of connection, cascade connection and T-branch connection.

In the present disclosure, the term "comprise" and its variations are intended to mean open-ended terms, not excluding any other elements and/or components that are not recited herein. The same applies to the terms "include", "have", and their variations.

In the present disclosure, a component suffixed with a term such as "member", "portion", "part", "element", "body", and "structure" is intended to mean that there is a single such component or a plurality of such components.

In the present disclosure, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

In the present disclosure, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A slave device comprising:
   a first connector configured to be connected to a master device;
   a second connector;
   a switch configured to be connected to the first connector to connect to another slave device when the second connector is not used to be connected to the another slave device and configured to be alternatively connected to the second connector when the second connector is used to be connected to the another slave device; and
   a communication circuit connected to the first connector and the switch to transmit and receive a first communication signal to and from the first connector and to transmit and receive a second communication signal to and from the switch,
   wherein when the slave device is turned on, the switch is configured to check a connection state indicating whether the switch is connected to the first connector or the second connector,
   wherein in an initial state of the switch, the switch is connected to one of the first connector and the second connector,
   wherein the switch is configured to transmit a check signal to the another slave device via the connector to which the switch is connected, and
   wherein when the switch has not received from the another slave device a response signal responsive to the check signal within a predetermined period of time, the switch is configured to be connected to another one of the first connector and the second connector.

2. The slave device according to claim 1, further comprising:
   a first transceiver provided between and connected to the first connector and the communication circuit;
   a second transceiver provided between and connected to the first connector and the switch; and
   a third transceiver provided between and connected to the second connector and the switch.

3. The slave device according to claim 2,
   wherein if the connection way is a T-branch connection, the switch is configured to be connected to the first connector, and
   wherein if the connection way is a cascade connection, the switch is configured to be connected to the second connector.

4. The slave device according to claim 3, wherein the communication circuit is configured to:
   manage the connection state;
   notify the switch of the connection state upon receipt of a connection request signal from the master device via the first connector; and
   switch the connection end based on the connection state that has been notified.

5. The slave device according to claim 2, wherein the communication circuit is configured to:
   manage the connection state;
   notify the switch of the connection state upon receipt of a connection request signal from the master device via the first connector; and
   switch the connection end based on the connection state that has been notified.

6. The slave device according to claim 1, further comprising:
   a first transceiver provided between and connected to the first connector and the communication circuit; and
   a second transceiver provided between and connected to the switch and the communication circuit.

7. The slave device according to claim 6,
   wherein if the connection way is a T-branch connection, the switch is configured to be connected to the first connector, and
   wherein if the connection way is a cascade connection, the switch is configured to be connected to the second connector.

8. The slave device according to claim 6, wherein the communication circuit is configured to:
   manage the connection state;
   notify the switch of the connection state upon receipt of a connection request signal from the master device via the first connector; and
   switch the connection end based on the connection state that has been notified.

9. The slave device according to claim 1,
   wherein if the connection way is a T-branch connection, the switch is configured to be connected to the first connector, and
   wherein if the connection way is a cascade connection, the switch is configured to be connected to the second connector.

10. The slave device according to claim 9, wherein the communication circuit is configured to:
    manage the connection state;
    notify the switch of the connection state upon receipt of a connection request signal from the master device via the first connector; and
    switch the connection end based on the connection state that has been notified.

11. A slave device comprising:
    a first connector;
    a second connector;
    a switch alternatively connectable to the first connector or the second connector according to a connection way via which the slave device is connected to a master device and another slave device; and
    a communication circuit connected to the first connector and the switch, configured to transmit and receive a first communication signal to and from the first connector, and configured to transmit and receive a second communication signal to and from the switch,
    wherein when the slave device is turned on, the switch is configured to check a connection state indicating whether the switch is connected to the first connector or the second connector, and
    wherein the communication circuit is configured to:

manage the connection state;
notify the switch of the connection state upon receipt of a connection request signal from the master device via the first connector; and
switch the connection end based on the connection state that has been notified.

12. A slave device comprising:
a first connector configured to be connected to a master device;
a second connector;
a switch configured to be connected to the first connector to connect to another slave device when the second connector is not used to be connected to the another slave device and configured to be alternatively connected to the second connector when the second connector is used to be connected to the another slave device; and
a communication circuit connected to the first connector and the switch to transmit and receive a first communication signal to and from the first connector and to transmit and receive a second communication signal to and from the switch,
wherein when the slave device is turned on, the switch is configured to check a connection state indicating whether the switch is connected to the first connector or the second connector,
wherein in an initial state of the switch, the switch is connected to one of the first connector and the second connector,
wherein upon receipt of a connection request signal from the master device via the first connector, the communication circuit is configured to forward the connection request signal to the another slave device via the switch,
wherein when the communication circuit has received from the another slave device a response signal responsive to the connection request signal within a predetermined period of time, the communication circuit is configured to transmit to the master device a connection completion signal responsive to the connection request signal, and
wherein when the communication circuit has not received from the another slave device the response signal within the predetermined period of time, the communication circuit is configured to control the switch to be connected to another one of the first connector and the second connector.

13. A communication system comprising:
a slave device;
a master device connected to the slave device;
another slave device connected to the slave device; and
the slave device comprising:
a first connector configured to be connected to the master device;
a second connector;
a switch configured to be connected to the first connector to connect to the another slave device when the second connector is not used to be connected to the another slave device and configured to be alternatively connected to the second connector when the second connector is used to be connected to the another slave device; and
a communication circuit connected to the first connector and the switch to transmit and receive a first communication signal to and from the first connector and to transmit and receive a second communication signal to and from the switch,
wherein when the slave device is turned on, the switch is configured to check a connection state indicating whether the switch is connected to the first connector or the second connector,
wherein in an initial state of the switch, the switch is connected to one of the first connector and the second connector,
wherein the switch is configured to transmit a check signal to the another slave device via the connector to which the switch is connected, and
wherein when the switch has not received from the another slave device a response signal responsive to the check signal within a predetermined period of time, the switch is configured to be connected to another one of the first connector and the second connector.

* * * * *